(12) United States Patent
Bhat et al.

(10) Patent No.: US 10,886,822 B2
(45) Date of Patent: Jan. 5, 2021

(54) ISOLATION RING FOR ISOLATING END WINDINGS OF A STARTER GENERATOR FOR A HYBRID ELECTRIC VEHICLE

(71) Applicant: CPT Group GmbH, Hannover (DE)

(72) Inventors: Uday Bhat, Roding (DE); Frank Eltner, Berlin (DE); Zoran Dmitrasinovic, Berlin (DE); Anton Beer, Roding (DE); Johannes Kohlstrunk, Berlin (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 104 days.

(21) Appl. No.: 16/290,586

(22) Filed: Mar. 1, 2019

(65) Prior Publication Data

US 2019/0280570 A1   Sep. 12, 2019

(30) Foreign Application Priority Data

Mar. 7, 2018   (EP) .................................... 18160594

(51) Int. Cl.
*H02K 11/25* (2016.01)
*H02K 3/38* (2006.01)
*B60K 6/26* (2007.10)

(52) U.S. Cl.
CPC ............... *H02K 11/25* (2016.01); *B60K 6/26* (2013.01); *H02K 3/38* (2013.01);
(Continued)

(58) Field of Classification Search
CPC   H02K 3/34; H02K 3/345; H02K 3/32; H02K 3/46; H02K 3/50; H02K 3/38;
(Continued)

(56) References Cited

U.S. PATENT DOCUMENTS 4,112,405 A * 9/1978 Joseph ................. H01F 27/402
                                                     310/68 C
4,188,553 A * 2/1980 Wheaton ............ H01H 37/5436
                                                     310/68 C
(Continued)

FOREIGN PATENT DOCUMENTS

DE   102016219221 A1   4/1918 ............. H02K 11/25
DE   102017222543 A1 * 6/2019 ............... H01R 4/28
(Continued)

OTHER PUBLICATIONS

English machine translation, JP 5693686. (Year: 2015).*
(Continued)

*Primary Examiner* — Burton S Mullins
(74) *Attorney, Agent, or Firm* — Slayden Grubert Beard PLLC

(57) ABSTRACT

Various embodiments include an isolation ring for isolating the end windings of a stator of an electrical machine, the isolation ring comprising: a protrusion with a conductor guide for receiving a conductor, wherein the protrusion comprises: a pressing flap with an inner guiding surface; and a pocket with a temperature sensor arranged in the pocket. The inner guiding surface faces the pocket. The pressing flap and the pocket are arranged so an end of the conductor inserted in the conductor guide is guided between the inner guiding surface and the temperature sensor, and the end is pressed against and/or guided to the temperature sensor.

13 Claims, 3 Drawing Sheets

(52) U.S. Cl.
CPC ..... *B60K 2006/268* (2013.01); *B60Y 2200/92* (2013.01); *B60Y 2400/47* (2013.01)

(58) Field of Classification Search
CPC ...... H02K 11/00; H02K 11/0094; G01K 1/14; B60K 6/26; B60K 2006/268; B60Y 2200/92; B60Y 2400/47
USPC .................................................. 310/71, 68 C
See application file for complete search history.

(56) References Cited

U.S. PATENT DOCUMENTS

| | | | | |
|---|---|---|---|---|
| 4,328,438 | A * | 5/1982 | Zolman | H02K 11/25 174/138 F |
| 8,183,728 | B2 * | 5/2012 | Schaflein | H02K 7/006 310/71 |
| 8,258,660 | B2 * | 9/2012 | Strobel | H02K 11/25 310/68 C |
| 8,358,094 | B2 * | 1/2013 | Zettner | G01J 5/00 318/473 |
| 9,190,888 | B2 * | 11/2015 | Dorner | H02K 3/521 |
| 9,608,499 | B2 * | 3/2017 | Bessho | H02K 3/522 |
| 9,806,577 | B2 * | 10/2017 | Kaneshige | H02K 3/50 |
| 10,256,703 | B2 * | 4/2019 | Wist | H02K 11/25 |
| 2013/0106251 | A1 * | 5/2013 | Kaneshige | G01K 13/00 310/68 B |
| 2013/0270973 | A1 * | 10/2013 | Ikemoto | H02K 11/25 310/68 C |
| 2014/0184031 | A1 * | 7/2014 | Kaneshige | H02K 11/25 310/68 B |
| 2014/0191629 | A1 | 7/2014 | Takahashi et al. | 310/68 C |
| 2017/0019000 | A1 * | 1/2017 | Sakamoto | H02K 11/25 |
| 2018/0156669 | A1 | 6/2018 | Koyama et al. | |
| 2018/0337580 | A1 * | 11/2018 | Baba | H02K 11/25 |

FOREIGN PATENT DOCUMENTS

| | | | | | |
|---|---|---|---|---|---|
| DE | 102018208384 | | * | 11/2019 | ............. H02K 11/25 |
| EP | 2160818 | B1 | * | 12/2016 | ............. H02K 11/25 |
| EP | 3562004 | A1 | * | 11/2019 | ............. H02K 11/25 |
| EP | 3567705 | A1 | * | 11/2019 | ............. H02K 11/25 |
| FR | 3037738 | A1 | * | 12/2016 | ............. H02K 11/25 |
| JP | 2013051807 | A | | 3/2013 | ............. H02K 1/18 |
| JP | 5609275 | B2 | | 10/2014 | |
| JP | 2015-053814 | A | | 3/2015 | |
| JP | 5693686 | B2 | * | 4/2015 | ............. H02K 11/00 |
| JP | 5938856 | B2 | | 6/2016 | |
| WO | 2017/118786 | A1 | | 7/1917 | ............. H02K 3/50 |
| WO | 2016/190198 | A1 | | 12/2016 | |
| WO | WO 2020026394 | A1 | * | 2/2020 | ............. H02K 11/25 |

OTHER PUBLICATIONS

Extended European Search Report, Application No. 18 16 0594, 6 pages, dated Aug. 23, 2018.
Chinese Office Action, Application No. 201910111231.2, 8 pages.

* cited by examiner

ISOLATION RING FOR ISOLATING END WINDINGS OF A STARTER GENERATOR FOR A HYBRID ELECTRIC VEHICLE

CROSS-REFERENCE TO RELATED APPLICATIONS

This application claims priority to EP Application No. 18160594 filed Mar. 7, 2018, the contents of which are hereby incorporated by reference in their entirety.

TECHNICAL FIELD

The present disclosure relates to electrical machines. Various embodiments may include an isolation ring for isolating the end windings of a stator of an electrical machine, comprising a support for arranging a temperature sensor for use with a belt starter generator of a hybrid electric vehicle.

BACKGROUND

In a rotating electric machine, a coil winding is provided on a stator or a rotor. An electric current flows to the coil winding when the rotating electric machine is driven. As a result, a conductor of the coil winding generates heat based on the electrical resistance of the conductor, and then the temperature of the coil winding rises. Inside a 48V electrical machine, the temperature can rise as high as 180° C. Therefore, it is important to measure and/or detect the precise temperature for safe functioning of the electrical machine such as a generator.

US 2014/0191629 A1 describes a stator including a stator core, a winding, and a temperature sensor. In the stator core, a plurality of slots are formed in a circumferential direction of the stator. The winding is formed by a plurality of conductors which are housed in the slots and are electrically connected. The slots are formed such that a predetermined number of the conductors are housed and arrayed in a radial direction of the stator. The temperature sensor is located in at least one of the slots and detects temperature of the conductors. Since the temperature sensor is arranged in the slot it is necessary that the sensor is reliably in contact with the conductor. Otherwise, an accurate measurement of the temperature cannot be achieved. Furthermore, the arrangement of the temperature sensor in the slots is time and cost intensive.

SUMMARY

The teachings of the present disclosure describe means for an accurate temperature detection of the end windings of a stator. For example, some embodiments include an isolation ring (10) for isolating the end windings of a stator of an electrical machine, comprising at least a protrusion (12) with a conductor guide (14) for receiving a conductor (16), wherein the protrusion (12) comprises a pressing flap (18) with an inner guiding surface (20), and a pocket (22), wherein a temperature sensor (24) is arranged in the pocket (22), and wherein the inner guiding surface (20) of the pressing flap (18) faces the pocket (22), and the pressing flap (18) and the pocket (22) are designed and arranged in such a way that an conductor end (32) of the conductor (16), inserted in the conductor guide (14), is at least partially guided between the inner guiding surface (20) and the temperature sensor (24), and the conductor end (32) is pressed against and/or guided to the temperature sensor (24).

In some embodiments, the inner guiding surface (20) is at least partially inclined with respect to the guiding direction of the conductor guide (14).

In some embodiments, the inclination of the inner guiding surface (20) with respect to the guiding direction of the conductor is between $0.5° \leq \theta \leq 15°$, preferably between $0.5° \leq \theta \leq 10°$, and more preferably between $0.5° \leq \theta \leq 5°$.

In some embodiments, the pocket (22) comprises a pocket bottom (42), facing the inner guiding surface (20), wherein the pocket bottom (42) comprises an inclination.

In some embodiments, the inclination of the pocket bottom (42) is different from the inclination of the inner guiding surface (20) of the pressing flap (18).

In some embodiments, the inclination of the pocket bottom (42) corresponds to the inclination of the inner guiding surface (20) of the pressing flap (18).

In some embodiments, the temperature sensor (24) is arranged in the pocket (22) by a form-fit connection, a force-fit connection and/or a cohesive connection (25).

In some embodiments, the height of the temperature sensor (24) is larger than the depth of the pocket (22) in a direction perpendicular to the guiding direction of the conductor guide (14).

In some embodiments, the protrusion (12) comprises a U-shaped design in a longitudinal section, having a longer upright bar (36) connected to the isolation ring (10) and a shorter upright bar (38) spaced to the isolation ring (10), wherein the longer upright bar (36) comprises the pocket (22) on its inner side facing the shorter upright bar (38), and the shorter upright bar (38) is designed as the pressing flap (18).

In some embodiments, the protrusion (12) comprises at least a first recess (26) and a second recess (28) at its distal end in axial direction of the isolation ring (10).

In some embodiments, the pressing flap (18) is arranged between the first recess (26) and the second recess (28).

In some embodiments, the isolation ring (10) and the protrusion (18) are designed as one piece.

As another example, some embodiments include an electrical machine with a stator comprising end windings with at least one conductor (16), wherein an isolation ring (10) as described above is arranged on the end windings, and the end of the conductor (16) is guided in the conductor guide (14), and the inner guiding surface (20) of the pressing flap (18) presses the end of the conductor against the temperature sensor.

BRIEF DESCRIPTION OF THE DRAWINGS

These and other aspects of the teachings herein are elucidated with reference to the embodiments as per the drawings described hereinafter. In the following description, exemplary embodiments of the teachings are explained with reference to the accompanying schematic drawing, wherein.

DETAILED DESCRIPTION

Figure 1:
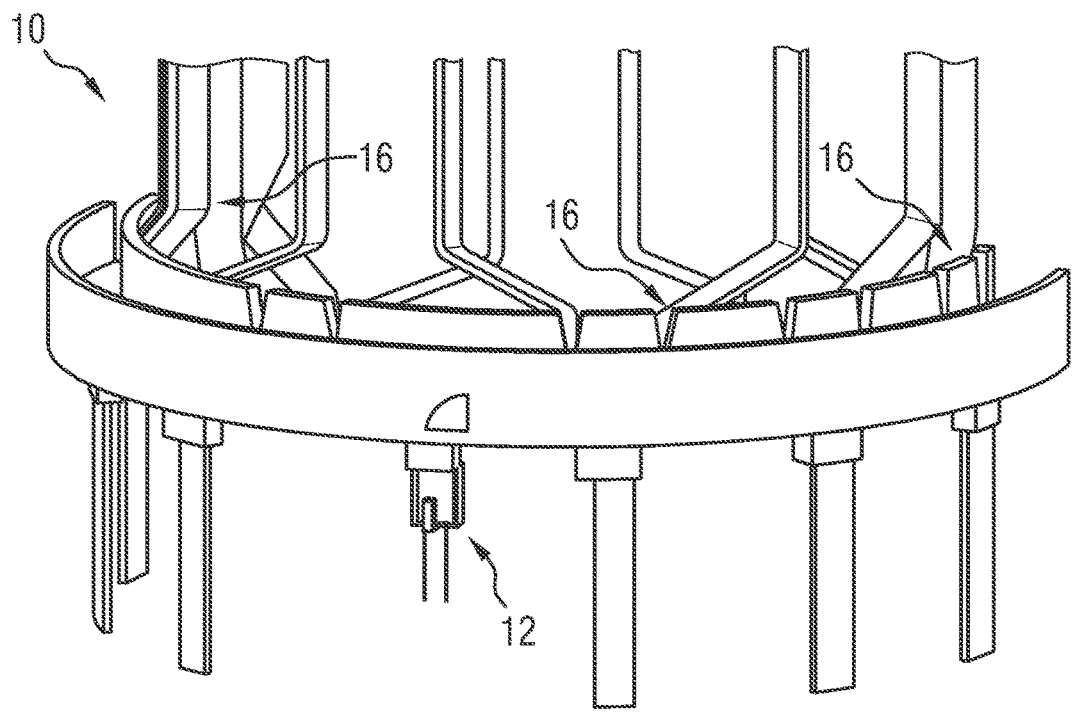
FIG. 1 shows an isolation ring with a protrusion incorporating teachings of the present disclosure.

In some embodiments, an isolation ring for isolating the end windings of a stator of an electrical machine comprises at least a protrusion with a conductor guide for receiving a conductor, wherein the protrusion comprises a pressing flap with an inner guiding surface, and a pocket, wherein a temperature sensor is arranged in the pocket, and wherein the inner guiding surface of the pressing flap faces the pocket, and the pressing flap and the pocket are designed and arranged in such a way that an end of a conductor, inserted in the conductor guide, is at least partially guided between the inner guiding surface and the temperature sensor, and the end of the conductor is pressed against and/or guided to the temperature sensor.

In some embodiments, an isolation ring is used for isolating the end windings of a stator of an electrical machine, e.g., a starter generator of a hybrid electric vehicle. The isolation ring comprises at least a protrusion with a conductor guide for receiving a conductor of the windings, wherein the conductor may be a neutral bridge. The neutral bridge is one of the hottest area of the electrical machine. Therefore, the temperature measured at the neutral bridge may be the most useful measurement.

In some embodiments, the protrusion comprises a pressing flap with an inner guiding surface, and a pocket, wherein a temperature sensor is arranged in the pocket. Hence, the temperature sensor can be easily and comfortably pre-installed in the pocket of the isolation ring.

In some embodiments, the inner guiding surface of the pressing flap faces the pocket respectively the conductor guide. The pressing flap and the pocket are arranged in such a way that an end of a conductor, inserted in the conductor guide, is at least partially guided between the inner guiding surface and the temperature sensor, and the end of the conductor is pressed against and/or guided to the temperature sensor. Hence, by arranging the isolation ring on the end windings of the stator and by inserting the conductor end in the conductor guide, the conductor end is directed to and/or pressed against the temperature sensor, especially against an upper contact surface of the temperature sensor, in such a way that the conductor end is in contact with the temperature sensor. Thus, the conductor end can be easily and reliably arranged to the temperature sensor. Hence, a mean for an accurate temperature detection of the end windings of a stator is provided.

In some embodiments, the guiding direction of the conductor guide corresponds to the axial direction of the isolation ring. In some embodiments, the pocket for the temperature sensor is arranged in radial direction and the inner guiding surface of the pressing flap is designed and arranged in such a way that the conductor end, inserted in the conductor guide, is at least partially guided in radial direction against the upper contact surface of the temperature sensor arranged in the pocket.

In some embodiments, the inner guiding surface is at least partially inclined with respect to the guiding direction of the conductor guide. Hence, by inserting the conductor end in the conductor guide, the end of the conductor slides along the inclined inner guiding surface. Thus, the end of the conductor can be automatically directed and pressed against the temperature sensor.

In some embodiments, the inclination of the inner guiding surface with respect to the guiding direction of the conductor, respectively to the axial direction of the isolation ring, is between $0.5°≤θ≤15°$, between $0.5°≤θ≤10°$ and or even between $0.5°≤θ≤5°$. An angle between $0.5°≤θ≤5°$ can be used for guiding rather stiff conductors in form of pins, e.g. I-pins.

In some embodiments, the pocket comprises a pocket bottom facing the inner guiding surface and/or the connector guide, wherein the pocket bottom is arranged parallel with respect to the guiding direction of the conductor, respectively to the axial direction of the isolation ring. In some embodiments, the pocket comprises a pocket bottom, facing the inner guiding surface, wherein the pocket bottom comprises an inclination. The inclination of the pocket bottom is directed in the same direction of the inclination of the inner guiding surface. Hence, when the conductor end, inserted in the conductor guide, is moved and pressed towards the temperature sensor, the conductor end can be basically arranged flat parallel to the contact surface of the temperature sensor. Hence, the contact area between the temperature sensor and the conductor can be increased, improving the accuracy for measuring the temperature.

In some embodiments, the inclination of the pocket bottom is different from the inclination of the inner guiding surface of the pressing flap. In some embodiments, the inclination of the pocket bottom is smaller, in general between 0.2° and 1°, than the inclination of the inner guiding surface. Depending on the deflection of the conductor end, the contact area between the conductor and the upper contact surface can be improved, leading to an increased accuracy for measuring the temperature of the windings. In some embodiments, the inclination of the pocket bottom corresponds to the inclination of the inner surface of the pressing flap.

In some embodiments, the temperature sensor is arranged in the pocket by a form-fit connection, a force-fit connection, and/or a cohesive connection. In some embodiments, the temperature sensor is firmly placed in the pocket by an epoxy or resin. Hence, the robustness of the sensor arrangement in the pocket and the resistance against vibrations of the conductor can be increased, since the temperature sensor sits firmly in the pocket. Furthermore, the isolation ring, including the temperature sensor can be easily and comfortably pre-manufactured. Thus, production cost can be decreased.

In some embodiments, the height of the temperature sensor is larger than the depth of the pocket in a direction perpendicular to the guiding direction of the conductor guide. Hence, the contact surface of the temperature sensor facing the inner guiding surface of the pressing flap slightly protrudes in the conductor guide. Thus, by defecting the conductor end while sliding along the inner guiding surface of the pressing flap, the conductor can be easily pressed against the upper contact surface of the temperature sensor.

In some embodiments, the protrusion comprises a U-shaped design in a longitudinal section, having a longer upright bar connected to the isolation ring and a shorter upright bar which is spaced to the isolation ring, wherein the longer upright bar comprises the pocket on its inner side facing the shorter upright bar, and the shorter upright bar is designed as the pressing flap. Since the end of the pressing flap facing the isolation ring is spaced to the isolation ring, there is an opening between the end of the pressing flap and the isolation ring. Via this opening the temperature sensor can be comfortably inserted in the pocket, arranged in the longer upright bar. Hence, an easy and comfortable installation of the temperature sensor in the pocket is provided.

In some embodiments, the protrusion comprises at least a first recess and a second recess at its distal end in axial direction of the isolation ring. Hence, connection pins of the temperature sensor arranged in the pocket can be guided in the first recess and the second recess. In some embodiments, the pressing flap is arranged between the first recess and the second recess.

In some embodiments, the isolation ring and the protrusion are designed as one piece. In some embodiments, the isolation ring and the protrusion are made of plastic. Hence, the isolation ring comprising the protrusion can be comfortably produced by molding in a molding tool. Thus, production cost can be decreased.

In some embodiments, an electrical machine comprises a stator comprising end windings with at least one conductor, wherein an isolation ring as described above is arranged on the end windings, and the end of the conductor is guided in the conductor guide, and the inner guiding surface of the pressing flap presses the conductor end against the temperature sensor.

FIG. 1 shows an isolation ring 10 for isolating end windings of a stator of an electrical machine. In some embodiments, the electrical machine is a 48V starter generator of a hybrid electric vehicle. The isolation ring 10 comprises at least a protrusion 12 with a conductor guide 14, configured as a slot, for receiving a conductor 16 of the windings, wherein the conductor 16 may be a neutral bridge. It has been found out that the neutral bridge is one of the hottest areas of the electrical machine. Therefore, the temperature measured at the neutral bridge may be most useful.

Figure 2:
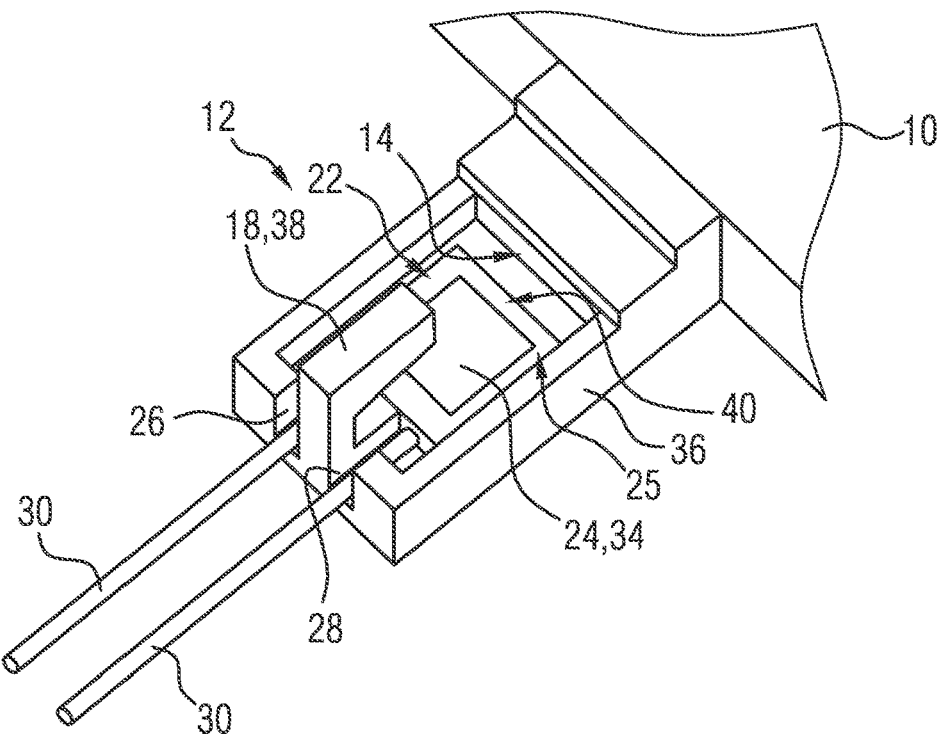
FIG. 2 shows a detailed view of the protrusion incorporating teachings of the present disclosure.

A detailed view of the protrusion 12 is shown in FIG. 2. The protrusion 12 comprises a pressing flap 18 with an inner guiding surface 20, and a pocket 22, wherein a temperature sensor 24 is arranged in the pocket 22. Hence, the temperature sensor 22 can be easily and comfortably pre-installed in the pocket 22 of the isolation ring 10. The temperature sensor 24 may be arranged in the pocket 22 by a cohesive connection 25. The temperature sensor 24 is firmly placed in the pocket 22 by an epoxy or resin. Hence, the robustness of the sensor arrangement in the pocket 22 and its resistance against vibrations of the conductor 16 can be increased, since the temperature sensor 24 sits firmly in the pocket 22. Furthermore, the isolation ring 10, including the temperature sensor 24 can be easily and comfortably pre-manufactured. Thus, production costs can be decreased.

In some embodiments, the protrusion 12 comprises at least a first recess 26 and a second recess 28 at its distal end in axial direction of the isolation ring 10. Hence, connection pins 30 of the temperature sensor 24 can be guided in the first recess 26 and the second recess 28. The pressing flap 18 is arranged between the first recess 26 and the second recess 28.

In some embodiments, the protrusion 12 comprises a U-shaped design in the longitudinal section, having a longer upright bar 36 connected to the isolation ring 10 and a shorter upright bar 38 which is spaced to the isolation ring 10, wherein the longer upright bar 36 comprises the pocket 22 on its inner side facing the shorter upright bar 38. The shorter upright bar 38 is designed as the pressing flap 18. Since the end of the pressing flap 18 facing the isolation ring 10 is spaced to the isolation ring 10, there is an opening 40 between the end of the pressing flap 18 and the isolation ring 10. Via this opening 40 the temperature sensor 24 can be inserted and fixed in the pocket 22. Hence, an easy and comfortable installation of the temperature sensor 24 in the pocket 22 is provided.

As shown in FIGS. 1 and 2, the guiding direction of the conductor guide 14 corresponds to the axial direction of the isolation ring 10. The pocket 22 for the temperature sensor 24 is arranged in radial direction. The inner guiding surface 20 of the pressing flap 18 is designed and arranged in such a way that the conductor end 32, inserted in the conductor guide 14 is at least partially guided in radial direction against an upper contact surface 34 of the temperature sensor 24.

Figure 3:
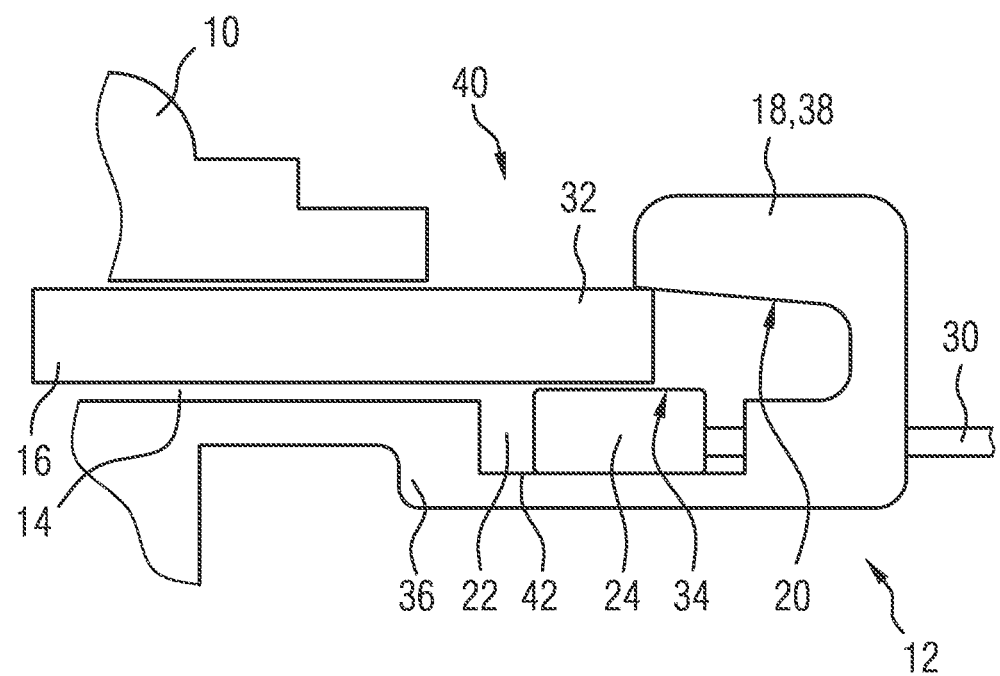
FIG. 3 shows a longitudinal section of the protrusion with a conductor inserted in the conductor guide of the protrusion incorporating teachings of the present disclosure.

According to FIG. 3, showing a longitudinal section through the pressing flap 18, the conductor 16 is not fully inserted to its end position in the conductor guide 14. The inner guiding surface 20 of the pressing flap 18 faces the pocket 22 respectively the conductor guide 14. The pressing flap 18 and the pocket 22 are designed and arranged in such a way that the conductor end 32, inserted in the conductor guide 14, is at least partially guided between the inner guiding surface 20 and the temperature sensor 24.

Figure 4:
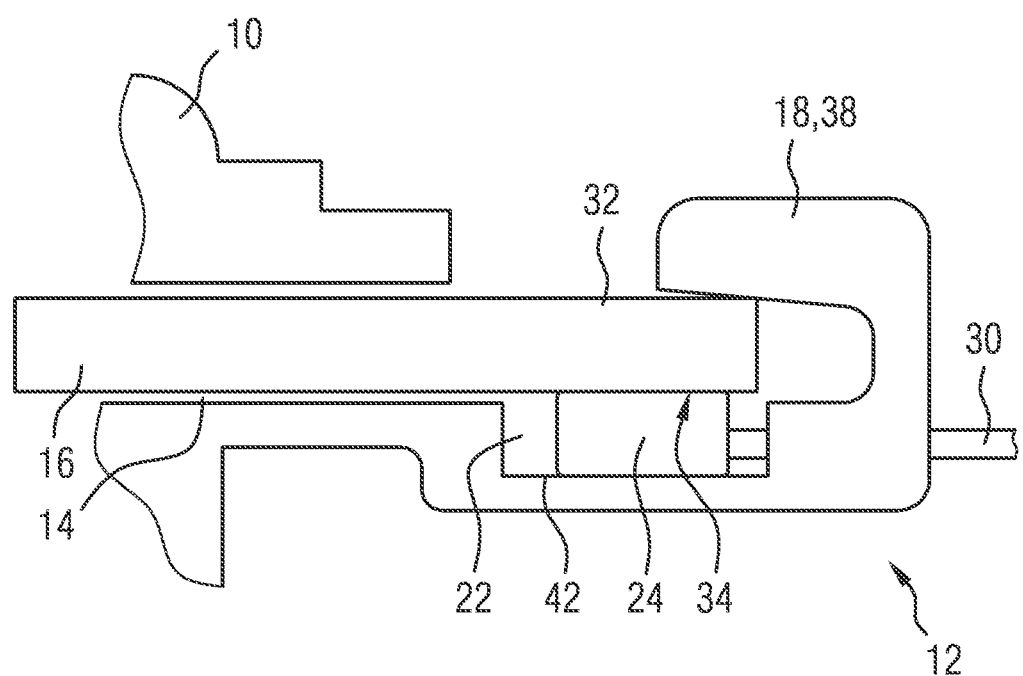
FIG. 4 shows a longitudinal section of the protrusion, wherein the conductor is arranged in an end position and pressed against a temperature sensor incorporating teachings of the present disclosure.

FIG. 4 shows the longitudinal section through the pressing flap 18 known from FIG. 3, wherein the conductor 16 is fully inserted to its end position in the conductor guide 14. The inner guiding surface 20 is at least partially inclined with respect to the guiding direction of the conductor guide 14. The inclination of the inner guiding surface 20 with respect to the guiding direction of the conductor 16 is $\theta \approx 5°$. Hence, by inserting the conductor end 32 in the conductor guide 14, the conductor end 32 slides along the inclined inner guiding surface 20. Thus, the conductor end is automatically directed and pressed against the upper contact surface 34 of the temperature sensor 24. FIG. 4 shows a translational movement of the conductor 16 in the direction of the temperature sensor 24, wherein the conductor end 32 is in contact with the upper contact surface 34 of the temperature sensor 24.

Figure 5:
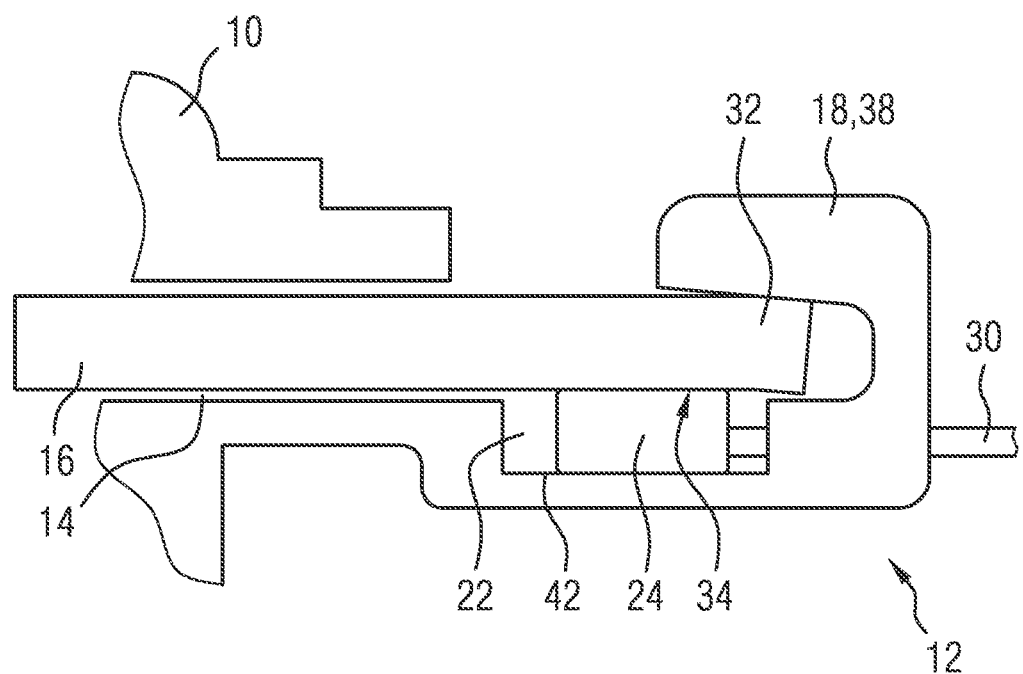
FIG. 5 shows a longitudinal section of the protrusion, wherein the conductor end is deflected and pressed against the temperature sensor incorporating teachings of the present disclosure.

FIG. 5 shows the longitudinal section through the pressing flap 18 known from FIG. 4, wherein the conductor 16 is fully inserted to its end position and the conductor end is deflected and pressed at least partially against the upper contact surface 34 of the temperature sensor 24.

Figure 6:
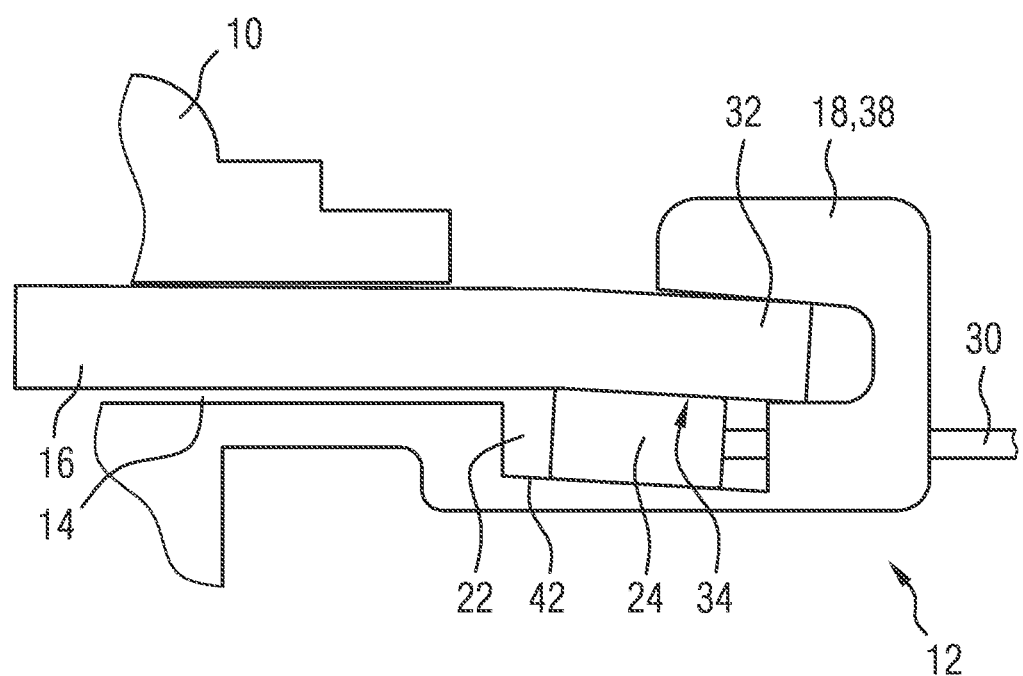
FIG. 6 shows a longitudinal section of the protrusion, wherein a pocket ground of a pocket accommodating the temperature sensor is inclined incorporating teachings of the present disclosure.

FIG. 6 shows the longitudinal section through the pressing flap 18 known from FIG. 5, wherein the conductor 16 is fully inserted to its end position and the conductor end is deflected and pressed against the temperature sensor 24. Furthermore, the pocket 22 comprises a pocket bottom 42, facing the inner guiding surface 20, wherein the pocket bottom 42 comprises an inclination. The inclination of the pocket bottom 42 is directed in the same direction of the inclination of the inner guiding surface 20. Hence, when the conductor end 32 is moved and pressed towards the temperature sensor 24, the conductor end 32 can be basically arranged flat parallel to the upper contact surface 34 of the temperature sensor 24. Thus, the contact area between the conductor end 32 and the contact surface 34 of the temperature sensor 24 can be increased, improving the accuracy for measuring the temperature of the conductor 16.

REFERENCE SIGNS

10 Isolation ring
12 Protrusion
14 Conductor guide
16 Conductor
18 Pressing flap
20 Inner guiding surface 22 Pocket
24 Temperature sensor
25 Cohesive connection
26 First recess
28 Second recess
30 Connection pins
32 Conductor end
34 Upper contact surface
36 Longer upright bar
38 Shorter upright bar
40 Opening
42 Bottom of pocket

The invention claimed is:

1. An isolation ring for isolating the end windings of a stator of an electrical machine, the isolation ring comprising:
   a protrusion with a conductor guide for receiving a conductor,
   wherein the protrusion comprises:
      a pressing flap with an inner guiding surface; and
      a pocket with a temperature sensor arranged in the pocket;
   wherein the inner guiding surface faces the pocket; and
   the pressing flap and the pocket are arranged so an end of the conductor inserted in the conductor guide is guided between the inner guiding surface and the temperature sensor, and the end is pressed against and/or guided to the temperature sensor.

2. An isolation ring according to claim 1, wherein the inner guiding surface is at least partially inclined with respect to the guiding direction of the conductor guide.

3. An isolation ring according to claim 1, wherein the inclination of the inner guiding surface with respect to the guiding direction of the conductor is between $0.5° \leq \theta \leq 15°$.

4. An isolation ring according to claim 1, wherein:
   the pocket comprises a pocket bottom facing the inner guiding surface; and
   the pocket bottom comprises an inclination.

5. An isolation ring according to claim 4, wherein the inclination of the pocket bottom differs from the inclination of the inner guiding surface of the pressing flap.

6. An isolation ring according to claim 4, wherein the inclination of the pocket bottom corresponds to the inclination of the inner guiding surface of the pressing flap.

7. An isolation ring according to claim 1, wherein the temperature sensor is retained in the pocket by a form-fit connection, a force-fit connection, and/or a cohesive connection.

8. An isolation ring according to claim 1, wherein a height of the temperature sensor is larger than a depth of the pocket in a direction perpendicular to the guiding direction of the conductor guide.

9. An isolation ring according to claim 1, wherein the protrusion comprises a U-shaped design in a longitudinal section, a longer upright bar connected to the isolation ring, and a shorter upright bar spaced from the isolation ring;
   wherein the longer upright bar comprises the pocket on an inner side of the longer upright bar facing the shorter upright bar; and
   the shorter upright bar comprises the pressing flap.

10. An isolation ring according to claim 1, wherein the protrusion comprises a first recess and a second recess at a distal end of the protrusion in an axial direction of the isolation ring.

11. An isolation ring according to claim 10, wherein the pressing flap is disposed between the first recess and the second recess.

12. Isolation ring according to claim 1, wherein the isolation ring and the protrusion are part of a single piece.

13. An electrical machine comprising:
   a stator having end windings and a conductor;
   an isolation ring arranged on the end windings, the isolation ring comprising a protrusion with a conductor guide for receiving a conductor, wherein the protrusion comprises:
      a pressing flap with an inner guiding surface; and
      a pocket with a temperature sensor arranged in the pocket;
   wherein the inner guiding surface faces the pocket;
   the pressing flap and the pocket are arranged so an end of the conductor inserted in the conductor guide is guided between the inner guiding surface and the temperature sensor, and the end is pressed against and/or guided to the temperature sensor;
   the end of the conductor is guided in the conductor guide; and
   the inner guiding surface of the pressing flap presses the end of the conductor against the temperature sensor.

* * * * *